(12) United States Patent
Liang et al.

(10) Patent No.: US 7,526,809 B2
(45) Date of Patent: Apr. 28, 2009

(54) SYSTEM AND METHOD FOR COMPUTER PROTECTION AGAINST MALICIOUS ELECTRONIC MAILS BY ANALYZING, PROFILING AND TRAPPING THE SAME

(75) Inventors: Yung Chang Liang, Cupertino, CA (US); Wei-Ching Chang, Taipei (TW); Sheng Richard, San Jose, CA (US); Ku Richard, San Jose, CA (US)

(73) Assignee: Trend Micro Incorporated, Tokyo (JP)

( * ) Notice: Subject to any disclaimer, the term of this patent is extended or adjusted under 35 U.S.C. 154(b) by 620 days.

(21) Appl. No.: 10/216,960

(22) Filed: Aug. 8, 2002

(65) Prior Publication Data

US 2004/0030913 A1 Feb. 12, 2004

(51) Int. Cl.
*G06F 11/00* (2006.01)
(52) U.S. Cl. ............... 726/24; 726/23; 713/187; 713/188; 705/51; 705/52; 705/53; 705/54
(58) Field of Classification Search ............... 726/24; 713/188
See application file for complete search history.

(56) References Cited

U.S. PATENT DOCUMENTS

| | | | |
|---|---|---|---|
| 5,440,723 A | | 8/1995 | Arnold et al. |
| 6,003,132 A | * | 12/1999 | Mann ............... 726/24 |
| 6,530,024 B1 | | 3/2003 | Proctor |
| 6,701,440 B1 | * | 3/2004 | Kim et al. ............... 726/24 |
| 6,757,830 B1 | * | 6/2004 | Tarbotton et al. ........... 713/188 |
| 6,886,099 B1 | * | 4/2005 | Smithson et al. ............... 726/24 |
| 6,963,980 B1 | * | 11/2005 | Mattsson ............... 713/194 |
| 6,971,019 B1 | | 11/2005 | Nachenberg |
| 7,290,282 B1 | * | 10/2007 | Renert ............... 726/24 |
| 7,340,776 B2 | | 3/2008 | Zobel et al. |
| 2002/0016959 A1 | | 2/2002 | Barton et al. |
| 2002/0035696 A1 | * | 3/2002 | Thacker ............... 713/200 |
| 2002/0104014 A1 | | 8/2002 | Zobel et al. |
| 2002/0162015 A1 | * | 10/2002 | Tang ............... 713/200 |
| 2003/0065941 A1 | | 4/2003 | Ballard et al. |
| 2003/0188196 A1 | | 10/2003 | Choi |

(Continued)

OTHER PUBLICATIONS

"What is flag? A Word Definition From Webopedia Computer Dictionary". Retrieved from www.webopedia.com on Jun. 22, 2006; pp. 1-3.

(Continued)

*Primary Examiner*—Kambiz Zand
*Assistant Examiner*—Roderick Tolentino
(74) *Attorney, Agent, or Firm*—Beyer Law Group LLP (57) ABSTRACT

A system and method in accordance with a preferred embodiment of the invention advantageously provide trapping of suspected electronic mails in dedicated mail address accounts under predetermined control. Trapped e-mails are profiled in order to determine if they contain malicious code. If it is determined that the profiled e-mails include malicious code embedded therein, the e-mails can then be submitted for subsequent analysis identifying the new virus(es) and developing a cure therefor. The profiling functionality serves to determine if a virus is embedded in the trapped e-mails. Using results of the profiling, the network system can, at the minimum, defend itself against damage from mail-borne viruses currently unknown to the virus database therein. Moreover, further analysis of the results of the profiling serves as the basis for developing antivirus countermeasures against the unknown viruses.

33 Claims, 10 Drawing Sheets

U.S. PATENT DOCUMENTS

2003/0191957 A1* 10/2003 Hypponen et al. .......... 713/200

OTHER PUBLICATIONS

Office Action dated Jan. 28, 2008 from U.S. Appl. No. 10/277,192.
Office Action dated May 23, 2007 from U.S. Appl. No. 10/277,192.
Final Office Action dated Jul. 20, 2006 from U.S. Appl. No. 10/277,192.
Office Action dated Dec. 29, 2005 from U.S. Appl. No. 10/277,192.
Final Office Action dated Aug. 22, 2007 from U.S. Appl. No. 10/411,665.
Office Action dated Jan. 29, 2007 from U.S. Appl. No. 10/411,665.
Office Action dated Mar. 28, 2008 from U.S. Appl. No. 10/411,665.

* cited by examiner

SYSTEM AND METHOD FOR COMPUTER PROTECTION AGAINST MALICIOUS ELECTRONIC MAILS BY ANALYZING, PROFILING AND TRAPPING THE SAME

BACKGROUND OF THE INVENTION

1. Field of the Invention

The present application generally relates to the protection of computer operation against computer viruses and, more particularly, to a system and method for trapping, profiling and analyzing malicious electronic mails for antivirus protection of computer operation.

2. Description of the Related Art

Electronic mail services implemented on computers, either desktop or mobile (laptop, handheld, personal digital assistants (PDAs), etc.), are basic communication services provided to end users of those computers. These electronic mail services implemented on computing and communication devices are vulnerable to malicious code or virus attacks.

Computer virus attacks to computing devices of electronic mail service providers are often aimed at targets other than the e-mail system itself. In addition to crippled e-mail services, often the entire functionality of an affected computing device is brought down. In many cases, these attacks are launched by malicious codes that are transported and spread in the form of computer viruses embedded in electronic mails.

Conventional electronic mail protection systems, specifically antivirus software protecting computer e-mail services, are frequently offered to users as a part of an overall antivirus software system to be installed on computers. These conventional antivirus software programs employ a basic technology that relies on the identification of viruses. Most antivirus software currently available in the art, including those specifically designed for e-mail system protection, are effective against known viruses but not so against unknown viruses. New viruses are analyzed by an antivirus service provider prior to developing a blocking countermeasure. For unknown viruses, typical antivirus software in the art unfortunately provides little or no protection for a computer receiving e-mails in a network.

There is therefore a general need in the art for an antivirus system and method overcoming at least the aforementioned shortcomings in the art.

In particular, there is a need in the art for a system and method for trapping suspected malicious e-mails that provide early warning of the arrival of suspected but unknown e-mails. Moreover, there is a need in the art for a system and method for profiling suspected malicious e-mails that accordingly adjust antivirus countermeasures for appropriate antivirus protection. There is a further need in the art for a system and method for analyzing malicious e-mails that advantageously provide virus identification, antivirus blocking and cure measures in a network.

SUMMARY OF THE INVENTION

A system in accordance with a preferred embodiment of the invention advantageously provides trapping of suspected electronic mails in dedicated mail address accounts under predetermined control. Trapped e-mails are profiled in order to determine if they contain malicious code. If it is determined that the profiled e-mails include malicious code embedded therein, the e-mails can then be submitted for subsequent analysis identifying the new virus(es) and developing a cure therefor.

The predetermined control in an exemplary antivirus system according to the invention advantageously prevents the system from being paralyzed by a virus-infected e-mail as the system implements its intended functionality in profiling the unknown and suspect e-mails. The profiling functionality serves to determine if a virus is embedded in the trapped e-mails. Using results of the profiling, the network system can, at the minimum, defend itself against damage from mail-borne viruses currently unknown to the virus database therein. Moreover, further analysis of the results of the profiling serves as the basis for developing antivirus countermeasures against the unknown viruses.

Once an e-mail reaches the dedicated mail account, the e-mail is profiled utilizing a standardized system of profiling. If, according to a predetermined profiling procedure, the trapped e-mail is determined to be infectious with an embedded computer virus, the e-mail undergoes further analysis. The trapped e-mail is analyzed so as to discern a corresponding virus pattern that can be added to the known virus database and used for future identification of the same type of mail-borne viruses.

A preferred embodiment of the network according to the invention comprising an intranet connected to the Internet, a plurality of client devices coupled with the intranet, an antivirus system trapping e-mails transmitted between the Internet and one of the client devices, a heuristic processor profiling the trapped e-mails and determining if any of the trapped e-mails are infected by a computer virus, a virus pattern generator generating a virus pattern for the computer virus, a computer virus database storing the generated virus pattern, and a countermeasure generator generating an antivirus cure for the computer virus.

A preferred embodiment of the antivirus method comprises the steps of trapping e-mails transmitted between the Internet and one of the client devices in a network, profiling the trapped e-mails, determining if any of the trapped e-mails are infected by a computer virus, generating a virus pattern for the computer virus, storing the generated virus pattern in a computer virus database in the network, and generating an antivirus cure for the computer virus.

A further embodiment of the network of the invention comprises an intranet connected to the Internet, a plurality of client devices coupled with the intranet, a computer virus database storing a plurality of known computer viruses, an antivirus system trapping e-mails transmitted between the Internet and one of the client devices and determining if any of the trapped e-mails are infected by any of the known computer viruses wherein all of the trapped e-mails determined to have been infected by any of the known computer viruses are discarded, a heuristic processor profiling the trapped e-mails and determining if any of the trapped e-mails are infected by an unknown computer virus other than the known computer viruses stored in the computer virus database, a virus generator generating a virus pattern for the unknown computer virus, and a countermeasure generator generating an antivirus cure for the unknown computer virus.

BRIEF DESCRIPTION OF THE DRAWINGS

The foregoing features and advantages of the invention will become more apparent in the following Detailed Description when read in conjunction with the accompanying drawings (not necessarily drawn to scale), in which.

DETAILED DESCRIPTION OF PREFERRED EMBODIMENTS

A system and method for trapping, profiling and analyzing suspected electronic mails in accordance with the invention can be applicable in at least the following exemplary scenarios. For instance, the system can be used at the end user site, where the trapped and suspected electronic mails are first profiled and then sent to an antivirus service provider for further analysis. The antivirus service provider accordingly conducts a detailed analysis of the suspicious e-mails so for devising and developing antivirus countermeasures, including analyzing the virus pattern, and formulating the appropriate cures.

A preferred embodiment of the network according to the invention comprising an intranet connected to the Internet, a plurality of client devices coupled with the intranet, an antivirus system trapping e-mails transmitted between the Internet and one of the client devices, a heuristic processor profiling the trapped e-mails and determining if any of the trapped e-mails are infected by a computer virus, a virus pattern generator generating a virus pattern for the computer virus, a computer virus database storing the generated virus pattern, and a countermeasure generator generating an antivirus cure for the computer virus.

In addition, the antivirus system according to a further embodiment of invention is advantageously applicable at the site of data security service provider such as an antivirus service provider. The trapping and profiling that precede the analysis of the suspicious e-mails are accordingly conducted on site at the antivirus service provider. Alternatively, the exemplary antivirus system according to the invention can implement its analysis on the suspected e-mails that are relayed back from client users scattered throughout the entire network. In particular, such data security service providers can also receive suspect mail information relayed from independent client users who separately conduct their own antivirus trapping and profiling operations.

Figure 1:
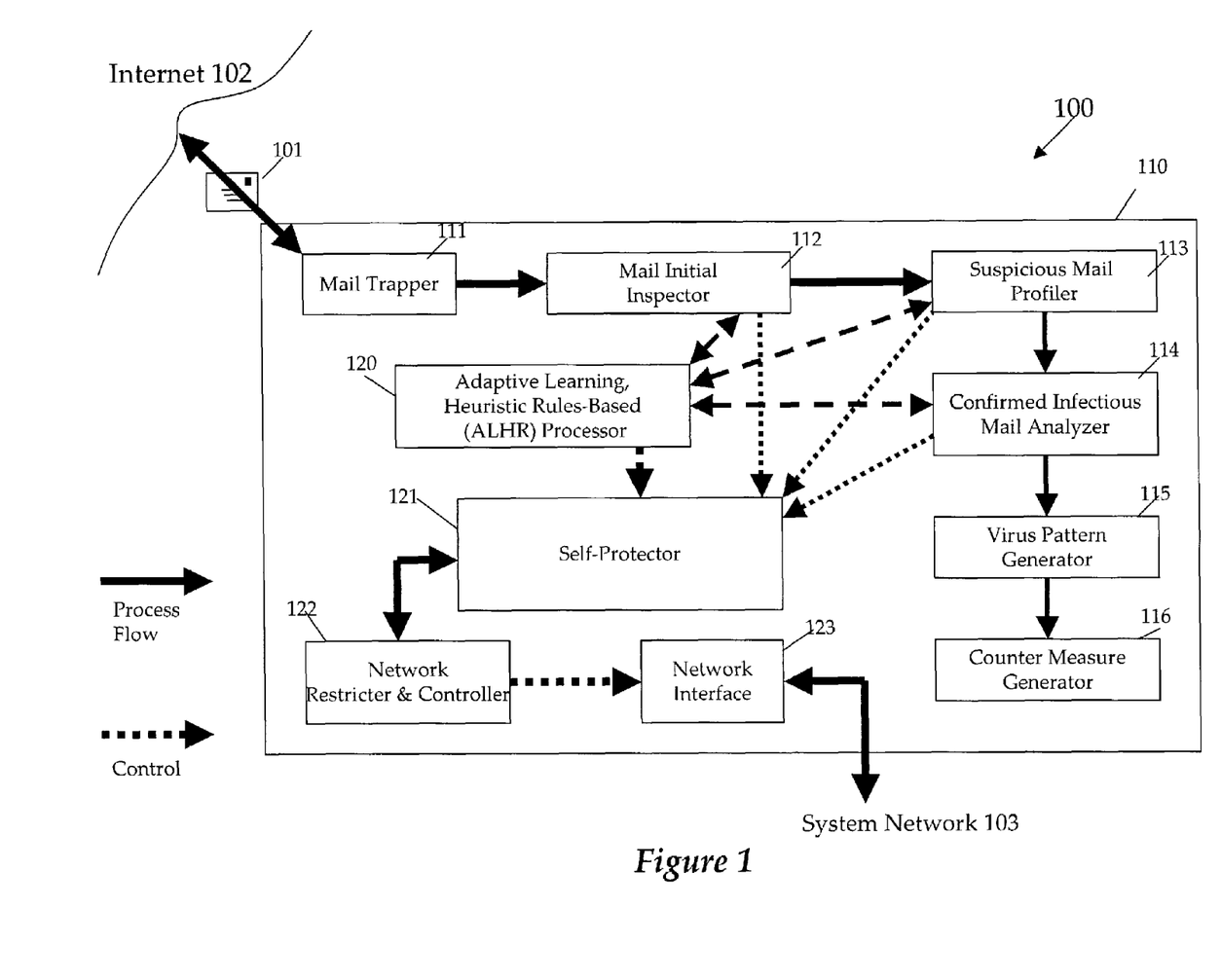
FIG. 1 is a block diagram generally illustrating the principal functional components of the antivirus system according to a preferred embodiment of invention.

FIG. 1 is a block diagram that generally illustrates the principal functional components of the electronic mail trapping, profiling and analyzing (TPA) system 100 according to a preferred embodiment of the invention. The TPA system 100 further comprises an e-mail TPA processing system 110 within or coupled to a corporate intranet, an individual computer or communications device, or a dedicated system of a data security service provider.

In FIG. 1, once an e-mail 101 transmitted between the Internet 102 and a computing device hosting the TPA processing system 110 is trapped by a trapper 111 in the e-mail TPA processing system 110, an initial inspection is performed on the trapped e-mail by an initial inspector 112 utilizing an adaptive learning heuristic rules-based (ALHR) processor 120. Note that the e-mail 101 may be coming into the computing device from the Internet 102 or sent by the computing device to the Internet.

If the initial inspector 112 determines that the trapped e-mail is suspicious in carrying any computer viruses, it transmits the suspicious e-mail to a suspicious e-mail profiler 113, which, utilizing ALHR processor 120, determines if there are any viruses embedded therein. If a virus infection is confirmed, the profiled e-mail is then transmitted to a confirmed infectious mail analyzer 114 for analyzing the profiled e-mail, again utilizing ALHR processor 120. The profiling and analysis data provided by e-mail profiler 113 and e-mail analyzer 114 are relayed to a virus pattern generator 115 to devise a virus signature, i.e., the virus pattern. This virus signature can be added to a computer virus database (not shown) so that the new virus is now stored as a known virus therein, which can be readily identified if and when it were again detected, either in the same computing device hosting the TPA processing system 110 or any other device deploying the virus database inclusive of the newly-obtained data on the same virus. Virus pattern generator 115 then transmits the virus signature, along with its profiled and analysis data, to an antivirus countermeasure generator 116. The countermeasure generator 116 accordingly provides a cure for the computing devices embodying the TPA system 100, which are infected by the suspected mail-borne virus.

As shown in FIG. 1, the TPA system 100 also comprises a self-protector 121 that advantageously prevents the network from temporary paralysis or crash due to the unknown virus. Self-protector 121 is provided for disconnecting the infected computing device(s) on which the TPA system 100 is installed communicable with a network 103. Self-protector 121 achieves this by utilizing a network controller 122 that provides direct control at the network interface of the infected computing device so as to disconnect the system from the network 103.

The network connection control for the self-protector 121 is to avoid the spreading of the incoming virus upon its detection prior to its contagion to other devices communicable through the network 103. Moreover, self-protector 121 can provide a restoration scheme for returning the infected device(s) to normal operation.

Self-protector 121 is directly controlled by the initial inspector 112, e-mail profiler 113 and e-mail analyzer 114, and similarly utilizes ALHR processor 120. Self-protector 121 controls access to the network 103 through the network controller 122 and network interface 123. This control ensures that a device implementing the TPA system 100 minimizes the possibility of crashing as results of the virus profiling and analysis are directly and promptly relayed to the self-protector 121. Self-protector 121 further implements predetermined adjustments of protection level so that the trapping and profiling can be performed with optimal security and efficiency.

A further embodiment of the network of the invention comprises an intranet connected to the Internet, a plurality of client devices coupled with the intranet, a computer virus database storing a plurality of known computer viruses, an antivirus system trapping e-mails transmitted between the Internet and one of the client devices and determining if any of the trapped e-mails are infected by any of the known computer viruses wherein all of the trapped e-mails determined to have been infected by any of the known computer viruses are discarded, a heuristic processor profiling the trapped e-mails and determining if any of the trapped e-mails are infected by an unknown computer virus other than the known computer viruses stored in the computer virus database, a virus generator generating a virus pattern for the unknown computer virus, and a countermeasure generator generating an antivirus cure for the unknown computer virus.

A preferred embodiment of the antivirus method comprises the steps of trapping e-mails transmitted between the Internet and one of the client devices in a network, profiling the trapped e-mails, determining if any of the trapped e-mails are infected by a computer virus, generating a virus pattern for the computer virus, storing the generated virus pattern in a computer virus database in the network, and generating an antivirus cure for the computer virus.

Figure 2:
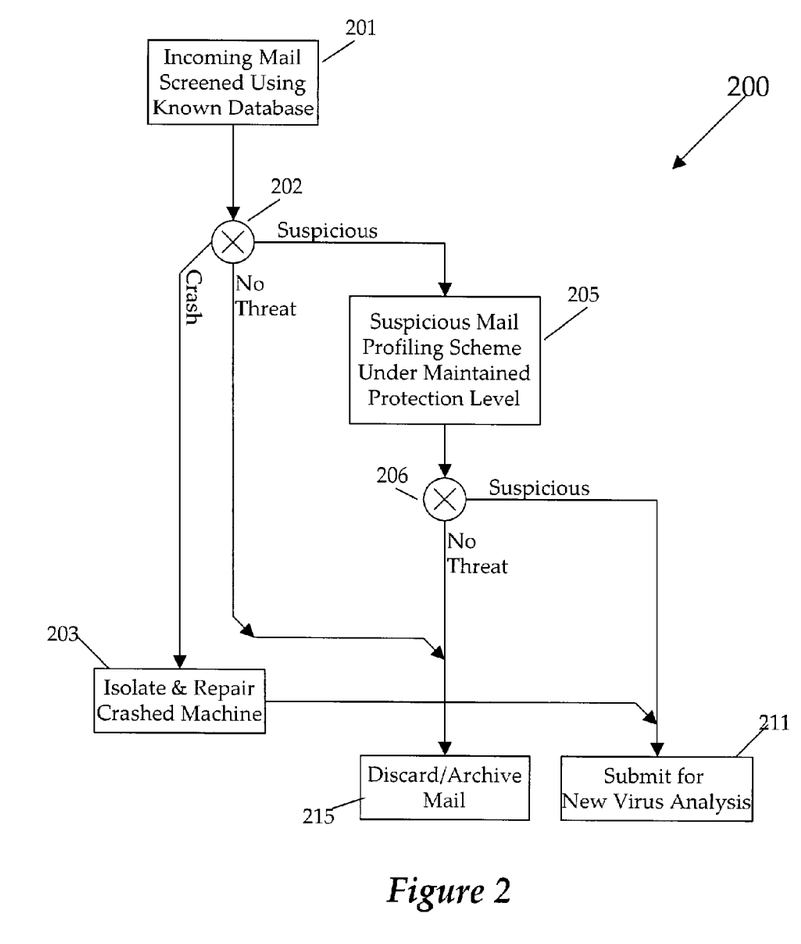
FIG. 2 is a flow diagram schematically illustrating an exemplary antivirus process according to a preferred embodiment of the invention.

FIG. 2 is a flow diagram schematically depicting the TPA process 200 according to a preferred embodiment of the antivirus method of the invention for trapping, profiling and analyzing malicious electronic mails. In this preferred embodiment, an electronic mail received by an individual computer can first be screened in step 201 based on the database of known viruses.

Responsive to the screening in step 201, the e-mail is routed to step 202. If the e-mail causes a system crash, the affected computing device is isolated and repaired in step 203. If the e-mail is determined to be non-threatening, it is discarded away from any further antivirus processing or accordingly archived in step 215. If the screening in step 201 produces any suspicion of a computer virus, the e-mail is then deemed suspect and is passed on to step 205 for further inspection.

The inspection of the suspect e-mail is conducted in step 205 with different grades of caution. For instance, the top priority for profiling is to protect the host computing device from being paralyzed by the virus embedded in the suspect e-mail. The invention according to this embodiment advantageously provides for protection levels in the inspection of suspect e-mails to be accordingly adjusted to meet different security levels of different network systems. For example, a low-sensitivity system with a back-up mechanism can have a relatively looser inspection criterion so that the system is not often interrupted. Conversely, a high-sensitivity system, such as an airline reservation system, can have a relatively tighter inspection criterion to prevent catastrophic virus damage.

If the inspection in step 205 returns a suspect e-mail, the process flow is routed to step 206. Preferably, in the case of an individual end user, the suspect e-mail is relayed to an antivirus service provider for further profiling and analysis in step 211. If the profiling in step 205 determines that the suspect e-mail does not contain a virus, it is deemed non-threatening and is either discarded away from any further antivirus processing or accordingly archived in step 215. The antivirus method according to the invention advantageously provides additional protection against unknown viruses in contrast to conventional antivirus software that is effective against known viruses only. At a minimum, virus alerts are raised, the system protection level accordingly heightened, and the suspect mail sent to antivirus service providers for appropriate treatment.

In accordance with this preferred embodiment of the invention, the TPA process 200 is implemented for unattended computing devices in a communications system. Computing devices are interfaced with isolation capability to immediately prevent the spreading of computer viruses. For continuous fail-safe system operation, the invention advantageously provides backup devices to replace infected computing devices as needed. The protection level at inspection 205 is dynamically adjusted to optimal system performance.

Figure 3:
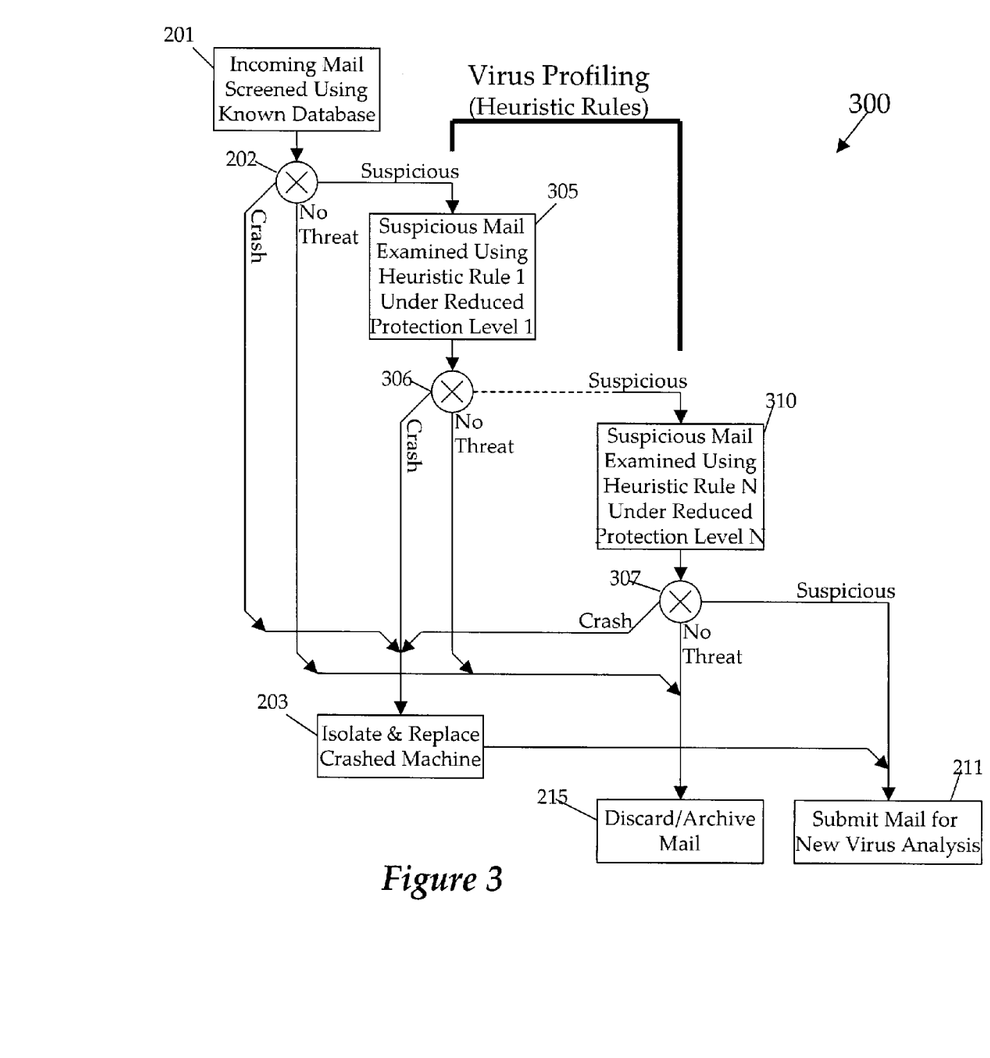
FIG. 3 is a flow diagram schematically illustrating an exemplary antivirus process that employs heuristic scanning for profiling suspected computer viruses according to the invention.

FIG. 3 is a flow diagram schematically depicting an exemplary antivirus process 300 utilizing heuristic scanning for profiling and inspecting the suspect virus according to the invention. In FIG. 3, the steps 201, 202, 203, 211 and 215 are generally identical to those in FIG. 2, which will not be repeated herein. Suspect e-mails are inspected in step 305 utilizing a heuristic rule under a reduced protection level.

If the suspect e-mail causes a crash, the affected computing device(s) are isolated and repaired in step 203. If the suspect e-mail is deemed non-threatening, it is discarded or archived in step 215. Alternatively, a heuristic rule under a reduced protection level can be implemented in step 310 with routing in step 307 for computing devices that have crashed, deemed non-threatening or suspect to step 306, as similarly described herein and above.

Figure 4:
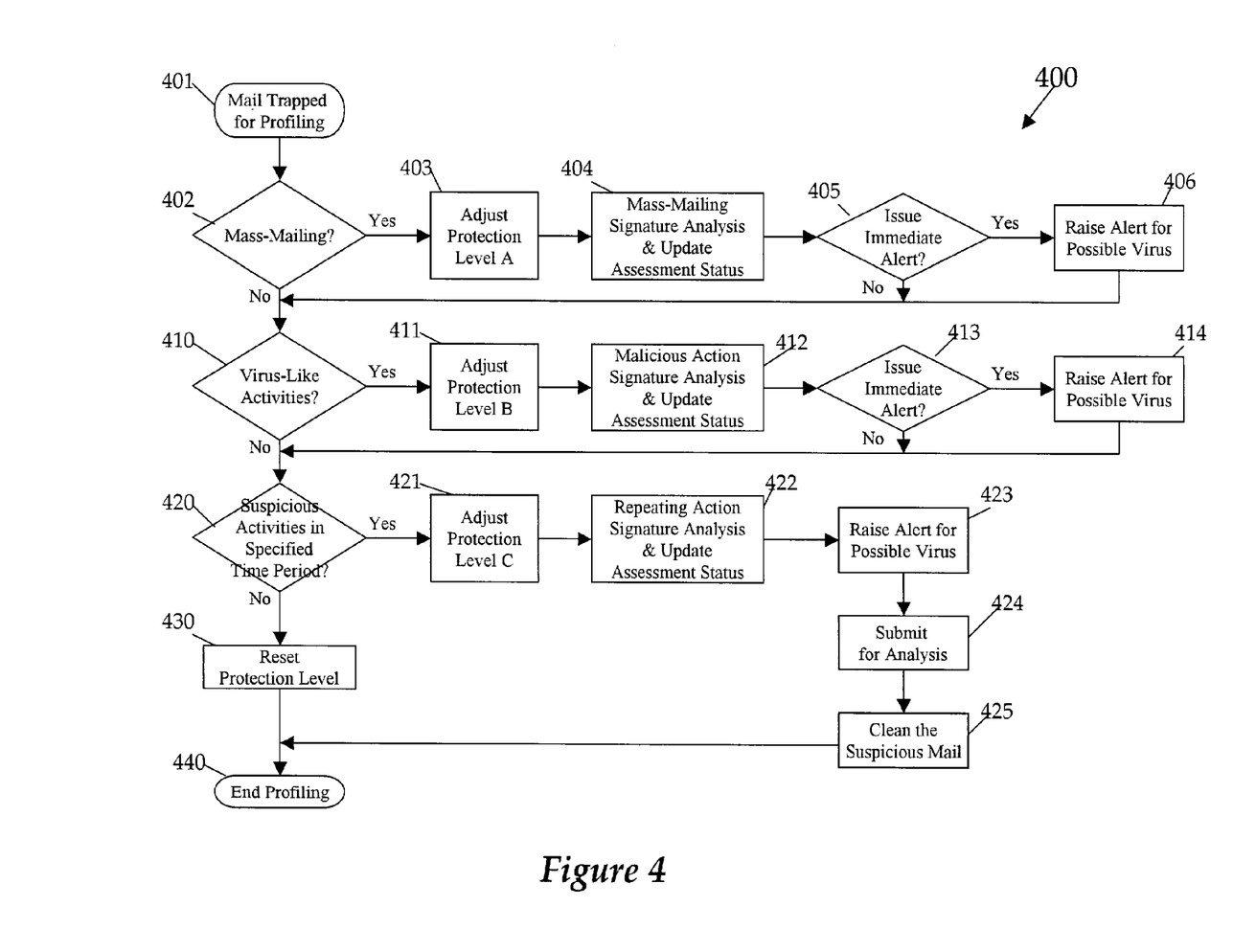
FIG. 4 is a flow diagram illustrating an exemplary embodiment of the heuristic rules employed for the heuristic scanning according to the invention as shown in FIG. 3.

FIG. 4 is a flow diagram schematically depicting an embodiment of the heuristic rules according to the invention for the heuristic inspection as exemplarily illustrated in FIG. 3. In this embodiment of the invention, an adaptive learning algorithm is utilized. As the profiling of the suspect e-mail is implemented, the results of the scanning inspection of the trapped mails with respect to their behavioral signatures can be reflected and updated in an assessment status database. Based on the adaptive learning algorithm utilized in the profiling of the trapped mails, factors such as the behavior of mass-mailing, virus-like malicious actions and frequency of recurrence can be accordingly analyzed and assessed in order to determine whether the trapped mails are suspect and infectious.

In the exemplary antivirus process 400 as depicted in FIG. 4, an e-mail is trapped for profiling in step 401. Whether the trapped mail is part of a mass mailing is determined in step 402. If the trapped mail is determined to be part of a mass mailing, then the protection level is accordingly adjusted to a particular level A in step 403. A mass mailing signature analysis is performed and the result is updated in an assessment status database in step 404. In step 405 it is determined whether and immediate virus alert should be issued. If so, then the alert for a computer virus is accordingly raised in step 406.

If it is determined in step 405 that an alert is not needed, then no alert is raised and the control flow accordingly proceeds to step 410 where a determination of virus-like activities is made. If it is determined in step 410 that there are virus-like activities, then the protection level is adjusted to another level B in step 411. A malicious action signature analysis is performed and the result is updated in an assessment status database in step 412. In step 413 if is determined whether an immediate alert should be issued. If so, then the alert for a computer virus is accordingly raised in step 414.

If it is determined in step 413 that an alert is not needed, then no alert is raised and the control flow accordingly proceeds to step 420 where a determination of suspicious activities in a specified time period is made. If it is determined that there are suspicious activities in step 420, the protection level is accordingly adjusted to yet another level C in step 421. Thereafter, signature analysis for repetitive activities is performed for the trapped mails and the results updated in assessment status database at 422. Next, an alert for a computer virus is raised in step 423. The trapped mails are submitted for analysis in step 424, and cleaned in step 425 which ends in step 440. If it is determined in step 420 that there are no suspicious activities, the protection level is reset in step 430 and the process 400 ends in step 440.

Figure 5:
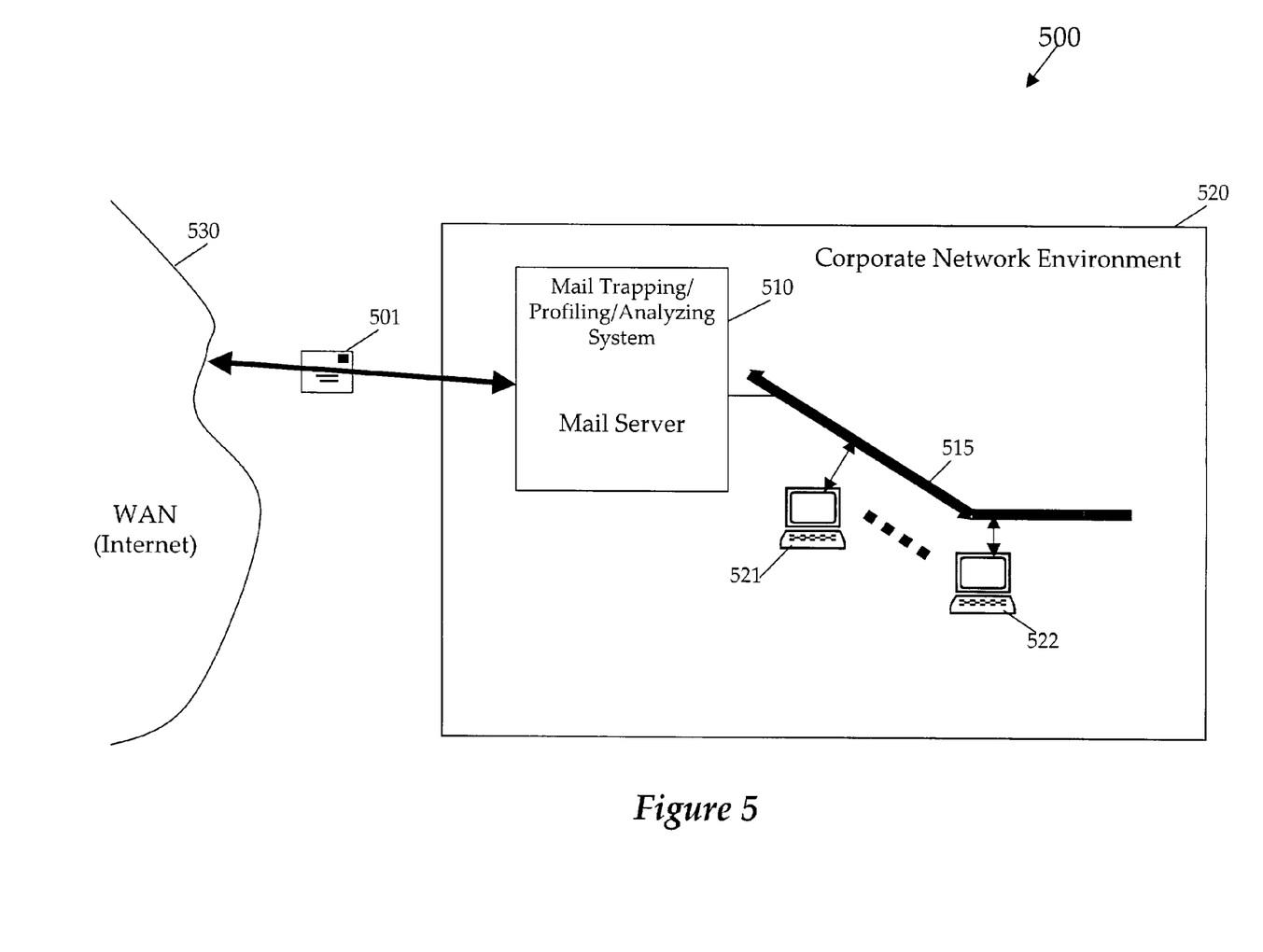
FIG. 5 is a block diagram schematically illustrating an antivirus system according to the invention as exemplarily implemented in a mail server system.

FIG. 5 is a block diagram schematically depicting an embodiment of the network 500 according to the invention for implementation in a mail server system. The system and method according to the invention for computer protection against malicious electronic mails can be utilized in mail servers or mail gateways installed for corporate computing environments.

In a typical corporate network environment as exemplified in FIG. 5, one or more computing devices are dedicated mail servers 510 that control mail traffic 501 between a wide area network (WAN), the Internet 530 and the corporate networking environment 520. Mail server 510 serves computers 521 and 522 through a communications link 515 which may be wireless or hardwired. Computers 521 and 522 may also be virtual machines residing in a hosting computer.

Both inflow and outflow e-mail traffic 501 are subject to the antivirus processing implemented by the system and method according to the invention. An outgoing e-mail profiled to be suspect and infectious alerts the potential presence of some unknown virus already in the mail server system. Actions including emergency network restrictions and antivirus countermeasures can accordingly be implemented in order to protect the corporate computing environment against such unknown viruses. Unknown viruses, which have already penetrated into the corporate computing environment but cannot be detected utilizing a conventional database of known viruses, can now be detected in accordance with the invention. In addition, malicious attacks launched by viruses carried by incoming mails can also be blocked utilizing the system and method according to the invention. Such blocking of inward malicious accesses to the network has the benefit of denying unknown viruses altogether.

Figure 6:
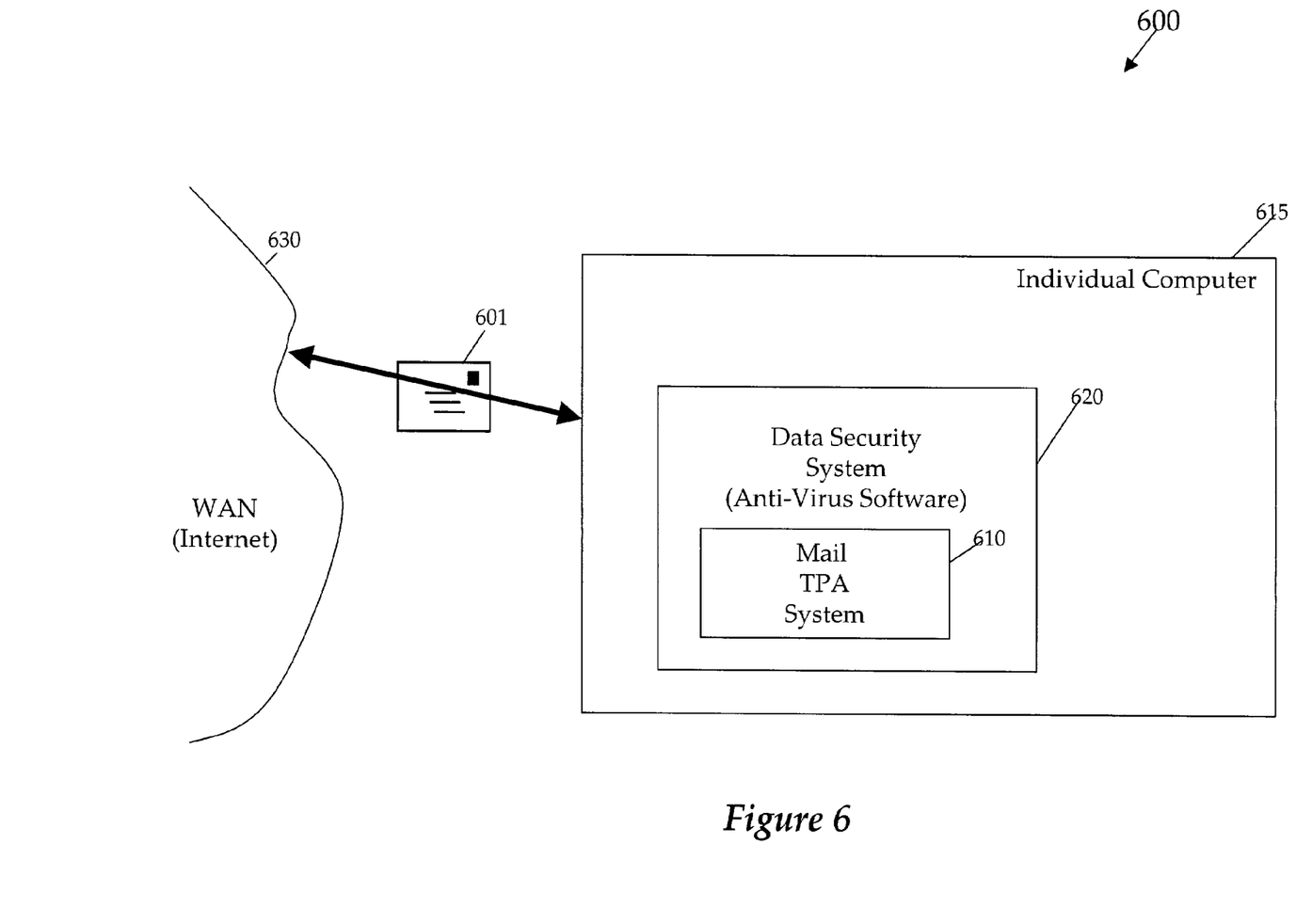
FIG. 6 is a block diagram schematically illustrating an antivirus system according to the invention as exemplarily implemented in an individual computing device.

FIG. 6 is a block diagram that schematically depicts a preferred embodiment of the network 600 in accordance with the invention for application to an individual computing or communications device 615. For example, the mail TPA system 610 according to the invention is installed on a personal computer (PC) used as a workstation by an individual to operate as part of, or in conjunction with, the data security system 620. The data security system 620 is, e.g., antivirus software.

The individual computer 615 is communicable with a wide area network (WAN) or the Internet 630, either directly or via a local area network (LAN) (not shown). The system 610 for trapping, profiling and analyzing of malicious electronic mails according to the invention can be installed on the individual computer 615 as a software package that can be used to defend it against attacks launched by unknown viruses carried by electronic mail traffic 601.

The defense provided by the system 610 is effective against mail-borne virus attacks launched either externally with respect to the computer 615 or internally from the computer 615 itself. The individual computer 615 may include another software system (or a software component of a system), an antivirus software in particular, installed therewith to provide protection from known computer viruses. In a preferred embodiment according to the invention, the system 610 can be constructed as a functional component of the overall data security system installed on the individual computer that provides antivirus protection against known and unknown viruses.

Figure 7:
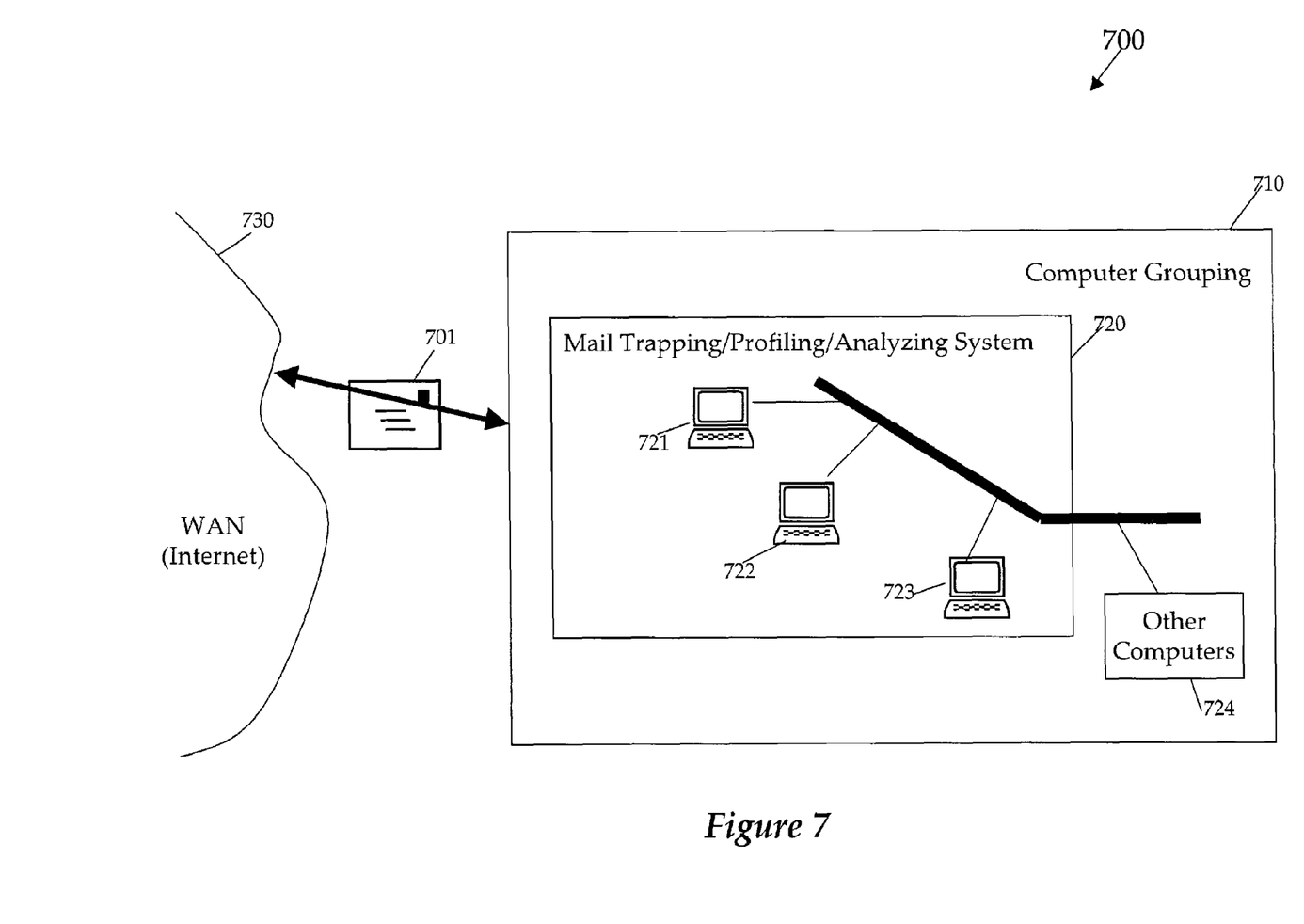
FIG. 7 is a block diagram schematically illustrating an antivirus system according to invention as exemplarily implemented in a dedicated network of a data security service provider.

FIG. 7 is a block diagram schematically depicting an embodiment of the invention for application to a dedicated network of a data security service provider. Implementation of the system and method for processing malicious electronic mail 700 on, e.g., a computer grouping 710 that includes a plurality of computers 721, 722, 723, and 724 communicable in a local area network (LAN) 715. Such an arrangement is adopted by users such as an antivirus service provider. Suspicious e-mail 701 can be forwarded to the antivirus service provider from client computers through a WAN or the Internet 730. In the embodiment of the network according to the invention as shown in FIG. 7, the TPA system 720 for unknown virus is implemented at the same site, e.g., on the computers 721, 722, and 723 in the network 720. In the system according to invention as depicted in FIG. 6, the trapping and profiling of unknown viruses are performed only on the user computer 615. The trapping performed on the computer of an individual user is primarily for antivirus protection by trapping a newly detected virus, while the profiling is instrumental in implementing dynamic protection of the particular computer receiving the suspect e-mails.

In reference to FIG. 6, the data obtained as a result of the profiling of the trapped e-mails at an individual computer can be relayed together with the trapped mails to an antivirus service provider for further profiling and analysis. The computers 721, 722, 724, and 724 in the computer grouping 710 of FIG. 7 can specifically be dedicated for e-mail virus identification and antivirus countermeasure development. Some computers in the system of FIG. 7 can be virtual machines operating inside one or more physical computers. The use of virtual machines in the system of FIG. 7 is advantageous in the reduction of both hardware complexity and installation costs. The virtual machines applicable in the embodiment of FIG. 7 can, either be dedicated virtual computing systems that perform e-mail trapping, profiling and associated analysis only in accordance with the invention, or full-featured virtual computing systems residing in host physical systems that also perform e-mail trapping, profiling and analysis. In either case, the virtual machines function as e-mail-capable computing devices with respect to the interacting individual computers connected over the WAN or Internet.

Figure 8:
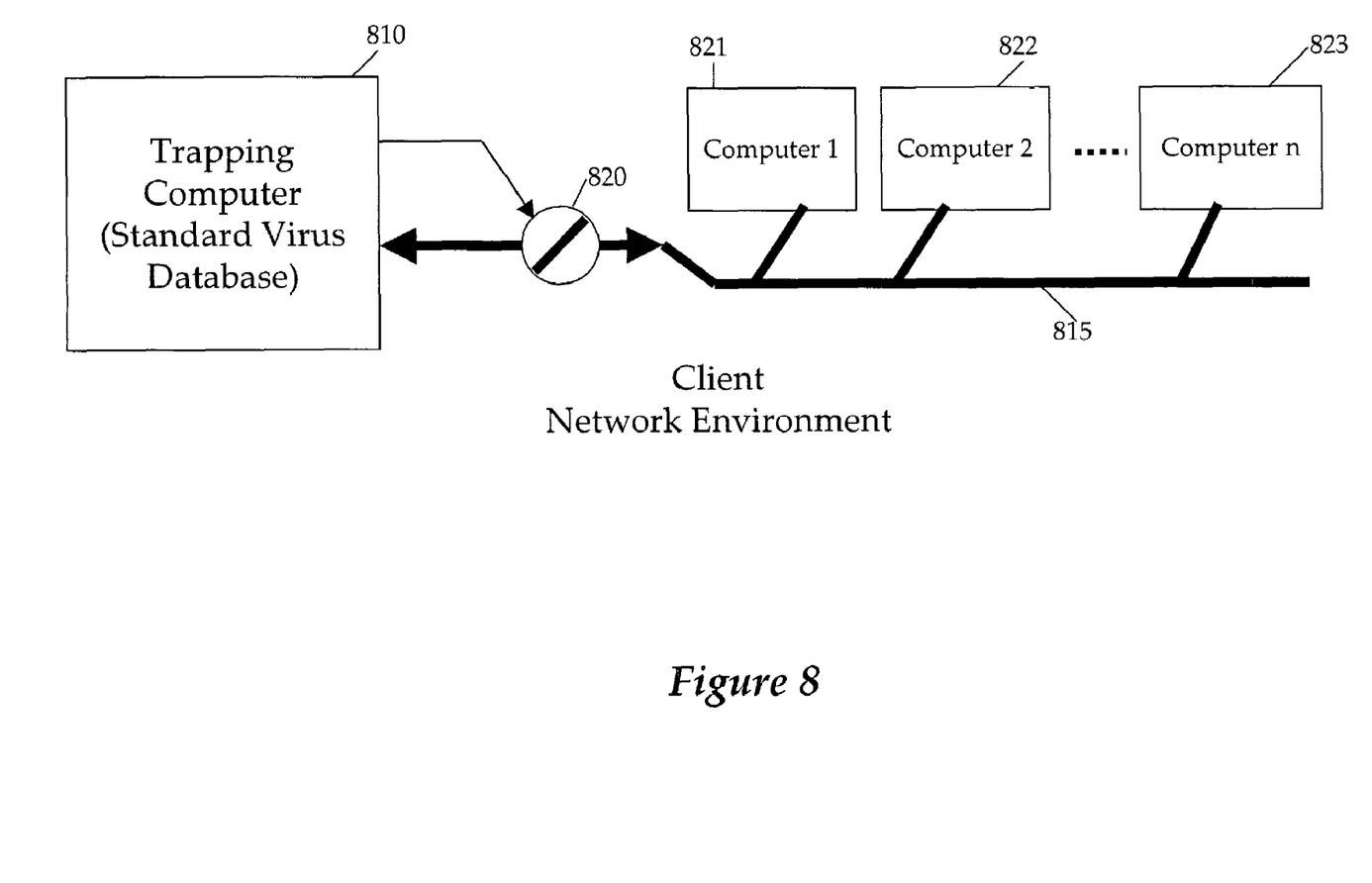
FIG. 8 is a block diagram illustrating an exemplary antivirus system that employs dynamic network connection control according to a further embodiment of the invention.

FIG. 8 is a block diagram illustrating an exemplary embodiment of the invention utilizing dynamic network connection control. The electronic mail TPA system 810 (e.g., one that implements the exemplary process antivirus as depicted in FIG. 2) utilizes dynamic network connection control 820. Dynamic network connection control 820 dynamically implements the disconnection of the computing device on which the TPA system 810 is installed. The TPA System 810 can be cut off from the rest of the network by severing the connection with the LAN 815 to which other computing devices 821, 822, and 823 are connected when a virus alert is raised. As the system of the invention implements the e-mail trapping, profiling and analysis with respect to the emerging mail-borne virus, it is possible that unknown viruses break through the system despite all the antivirus protection measures and successfully deploy attack therein. In such a scenario, the infected computing devices are disconnected from the network so as to prevent the spreading of the unknown viruses to other computing devices therein.

Figure 9:
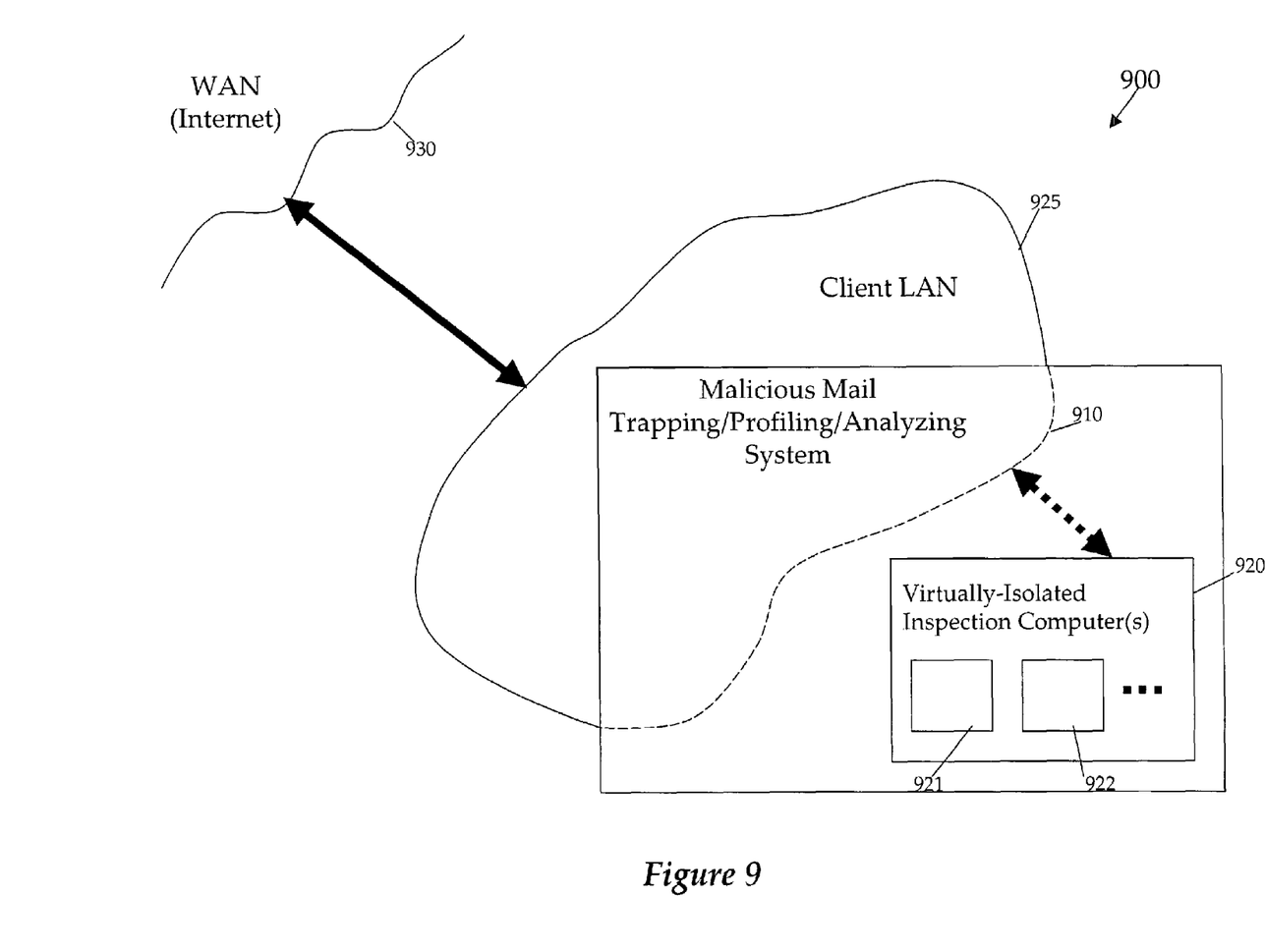
FIG. 9 is a block diagram illustrating an exemplary antivirus system for dynamically isolating the inspection and trapping functionalities in the system in accordance with another embodiment of the invention.

FIG. 9 is a block diagram that schematically illustrates a system 900 in accordance with a preferred embodiment of the invention utilizing dynamic isolation of the inspection and trapping computers therein. A restricted and controlled connection is dynamically implemented between the entire group of computers and these outside the network utilizing individual computers embodying the mail TPA system 910 according to the invention within, e.g., a client LAN 925 communicable with a WAN or the Internet 930. A plurality of physical (not shown) and virtual computers 920 can be setup therein to facilitate a more detailed profiling process for the trapped e-mails, as exemplarily described above with reference to FIG. 3. Computers 921 and 923 can also be virtually isolated inspection computers in accordance with the invention.

Figure 10:
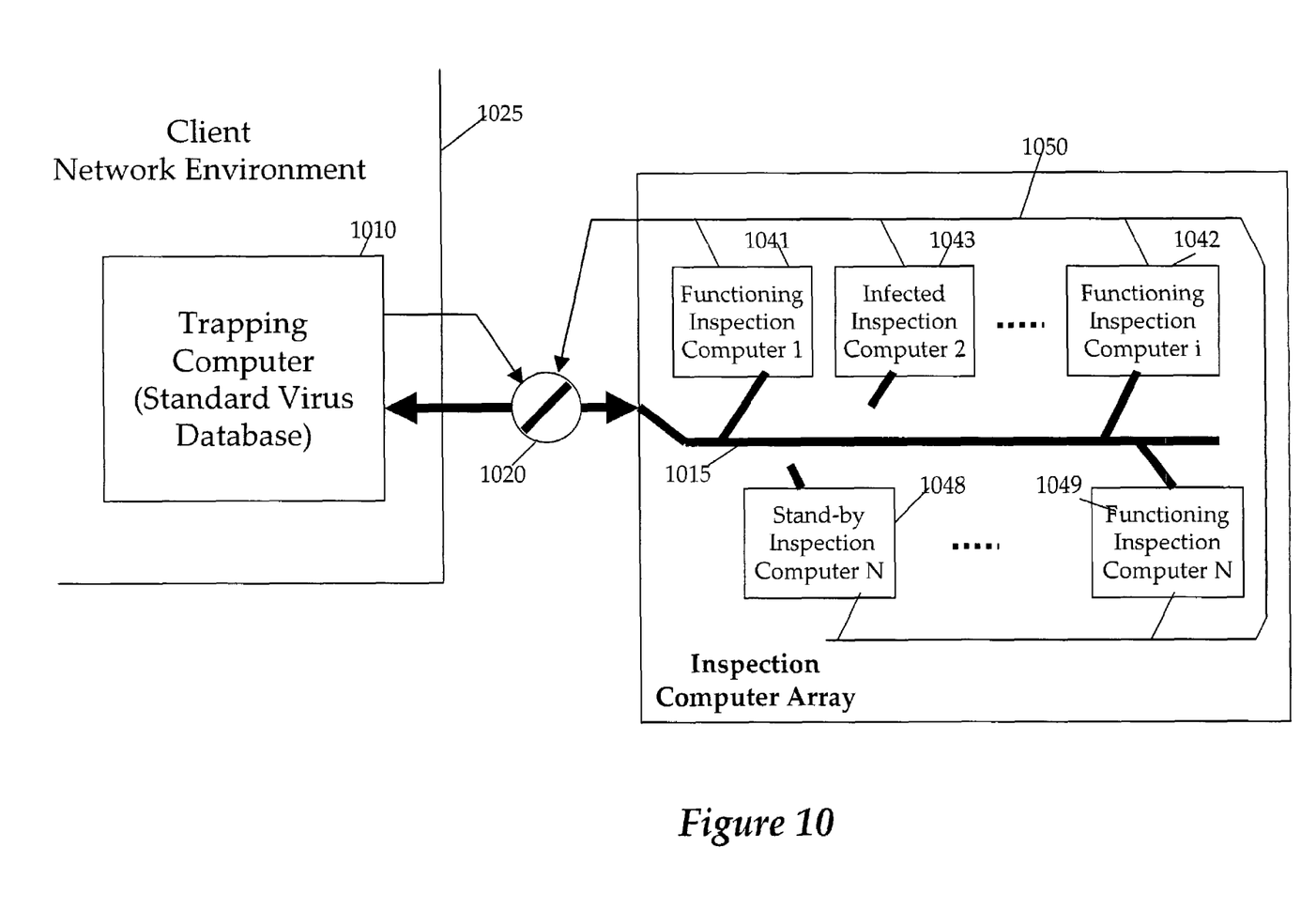
FIG. 10 is a block diagram that illustrates the system exemplarily shown in FIG. 3 employing a dynamic network connection control in accordance with the invention.

All computers in the profiling process of the suspect e-mails are also susceptible to the infection of the unknown viruses embedded therein. It is possible that any of these computers can be infected and shut down as a result. They therefore need to be virtually isolated from the rest of the network on site. FIG. 10 is a block diagram illustrating the electronic mail TPA system described above with reference to FIG. 3 that employs dynamic network connection control. A dynamic network connection control 1020 controls the interface between the mail TPA system 1010 in a client network environment 1025, and an array of inspection machines 1040 including inspection computers 1041, 1042, and 1049, an infected inspection computer 1043 and an exemplary stand-by inspection machine 1048, all of which are communicable with dynamic network connection control 1020 both through communications link 1050 (which may be wireless or hardwired) and via internal network link 1015 (e.g., a LAN).

It is understood that although the above examples were primarily concerned with computer networks the present invention is also advantageously applicable to any kind of network (such as the Internet, a WAN, or a LAN) having any kind of computing or communications terminal or subscriber device. Therefore, the scope of applicability of the invention includes mobile phone network systems, personal digital assistant (PDA) devices, handyphone systems, cellular mobile devices of any scale, and any other communications system that utilizes a network, be it wired or wireless.

It would be apparent to one skilled in the art that the invention can be embodied in various ways and implemented in many variations. Such variations are not to be regarded as a departure from the spirit and scope of the invention. In particular, the process steps of the method according to the invention will include methods having substantially the same process steps as the method of the invention to achieve substantially the same results. Substitutions and modifications have been suggested in the foregoing Detailed Description, and others will occur to one of ordinary skill in the art. All such modifications as would be obvious to one skilled in the art are intended to be included within the scope of the following claims and their equivalents.

We claim:

1. A network comprising:
an intranet connected to the Internet;
a plurality of client devices coupled with said intranet;
an antivirus system that traps e-mail messages transmitted between the Internet and one of said client devices, said trapped e-mail messages being stopped and stored before reaching said client device by a trapping module not residing on said client device;
a heuristic-based processor that profiles one of said trapped e-mail messages to determine a protection level and determines that said one trapped e-mail message is infected by an unknown computer virus according to a heuristic rule dependent upon said protection level;
a virus pattern generator that generates a virus pattern for said unknown computer virus;
a computer virus database that stores said generated virus pattern; and
a countermeasure generator that generates an antivirus cure for said unknown computer virus using said generated virus pattern, whereby said antivirus cure is produced to counteract said unknown computer virus.

2. The network of claim 1 wherein said client devices include computers and communications devices, personal computers (PCs), workstations, mobile telephones, and personal digital assistants (PDAs).

3. The network of claim 1 wherein said intranet includes a local area network (LAN) and a wide area network (WAN).

4. The network of claim 1 further comprising a network controller arranged to disconnect one of said client devices that is infected by one of said trapped e-mail messages from said network.

5. The network of claim 4 further comprising backup client devices arranged to replace said infected client device.

6. The network of claim 1 wherein a virus alert for said unknown computer virus is sent to said client devices.

7. The network of claim 1 further comprising an analyzer that analyzes said infected e-mail messages resulting in analysis data used in generating said virus pattern.

8. The network of claim 1 wherein said trapped e-mail messages are profiled according to an antivirus security sensitivity level.

9. The network of claim 8 wherein said sensitivity level is heightened if it is determined that said trapped e-mail messages are infected by said unknown computer virus.

10. The network of claim 8 wherein said sensitivity level is lowered if it is determined that said trapped e-mail messages are not infected by said unknown computer virus.

11. An antivirus method for a network having a plurality of client devices, the method comprising the steps of:
trapping an e-mail messages transmitted between the Internet and one of said client devices, said trapped e-mail messages being stopped and stored before reaching said client device by a trapping module not residing on said client device;
profiling said trapped e-mail message to determine a protection level;
determining if any of said trapped e-mail messages are infected by an unknown computer virus according to a heuristic rule selected based upon said protection level;
generating a virus pattern for said unknown computer virus;
storing said generated virus pattern in a computer virus database; and
generating an antivirus cure for said unknown computer virus using said generated virus pattern, whereby said antivirus cure is produced to counteract said unknown computer virus.

12. The method of claim 11 wherein said client devices include computers and communications devices, personal computers (PCs), workstations, mobile telephones, and personal digital assistants (PDAs).

13. The method of claim 11 wherein said network is coupled with an intranet including a local area network (LAN) and a wide area network (WAN).

14. The method of claim 11 further comprising
disconnecting one of said client devices affected by said infected e-mails from said network.

15. The method of claim 14 further comprising
replacing said infected client device with a backup client device.

16. The method of claim 11 further comprising
sending a virus alert for said unknown computer virus to said client devices.

17. The method of claim 11 further comprising
analyzing said infected e-mail messages resulting in analysis data used in generating said virus pattern.

18. The method of claim 11 wherein said trapped e-mail messages are profiled according to an antivirus security sensitivity level.

19. The method of claim 18 further comprising
heightening said sensitivity level if it is determined that said trapped e-mail messages are infected by said unknown computer virus.

20. The method of claim 18 further comprising
lowering said sensitivity level if it is determined that said trapped e-mail messages are not infected by said unknown computer virus.

21. A network comprising:
an intranet connected to the Internet;
a plurality of client devices coupled with said intranet;
a computer virus database storing a plurality of known computer viruses;
an antivirus system that traps e-mail messages transmitted between the Internet and one of said client devices and determines if any of said trapped e-mail messages are infected by any of said known computer viruses, said trapped e-mail messages being stopped and stored before reaching said client device by a trapping module not residing on said client device, wherein all of said trapped e-mail messages determined to have been infected by any of said known computer viruses are discarded;
a heuristic-based processor that profiles said trapped e-mail messages, and determines if any of said trapped e-mail messages are infected by an unknown computer virus other than said known computer viruses stored in said computer virus database;
a virus generator that generates a virus pattern for said unknown computer virus; and
a countermeasure generator that generates an antivirus cure for said unknown computer virus using said generated virus pattern, whereby said antivirus cure is produced to counteract said unknown computer virus.

22. The network of claim 21 wherein said client devices include computers and communications devices, personal computers (PCs), workstations, mobile telephones, and personal digital assistants (PDAs).

23. The network of claim 21 wherein all of said trapped e-mail messages determined to have been infected by any of said unknown computer virus are discarded.

24. The network of claim 21 further comprising
a network controller arranged to disconnect one of said client devices that is infected by said known and unknown viruses from said network.

25. The network of claim 24 further comprising
backup client devices arranged to replace said infected client device.

26. The network of claim 21 wherein virus alerts for said known and unknown viruses are sent to said client devices.

27. The network of claim 21 further comprising
an analyzer that analyzes said trapped e-mail messages infected by said unknown computer virus resulting in analysis data used in generating said virus pattern.

28. The network of claim 21 wherein said trapped e-mail messages are profiled according to an antivirus security sensitivity level.

29. The network of claim 28 wherein said sensitivity level is heightened if it is determined that said trapped e-mail messages are infected by said unknown computer virus.

30. The network of claim 28 wherein said sensitivity level is lowered if it is determined that said trapped e-mail messages are not infected by said unknown computer virus.

31. A network as recited in claim 1 wherein said antivirus system traps said e-mail messages into a dedicated e-mail address account.

32. A method as recited in claim 11 further comprising:
trapping said e-mail messages into a dedicated e-mail address account.

33. A network as recited in claim 21 wherein said antivirus system traps said e-mail messages into a dedicated e-mail address account.

* * * * *